April 2, 1963 R. F. SANFORD 3,084,224

MAGNETIC RECORDING

Filed Dec. 18, 1958

INVENTOR.
ROBERT F. SANFORD
BY Morris A. Rabkin
ATTORNEY

United States Patent Office 3,084,224

Patented Apr. 2, 1963

3,084,224

MAGNETIC RECORDING

Robert F. Sanford, Cranbury, N.J., assignor to Radio Corporation of America, a corporation of Delaware Filed Dec. 18, 1958, Ser. No. 781,365

11 Claims. (Cl. 179—100.2)

Figure 1:
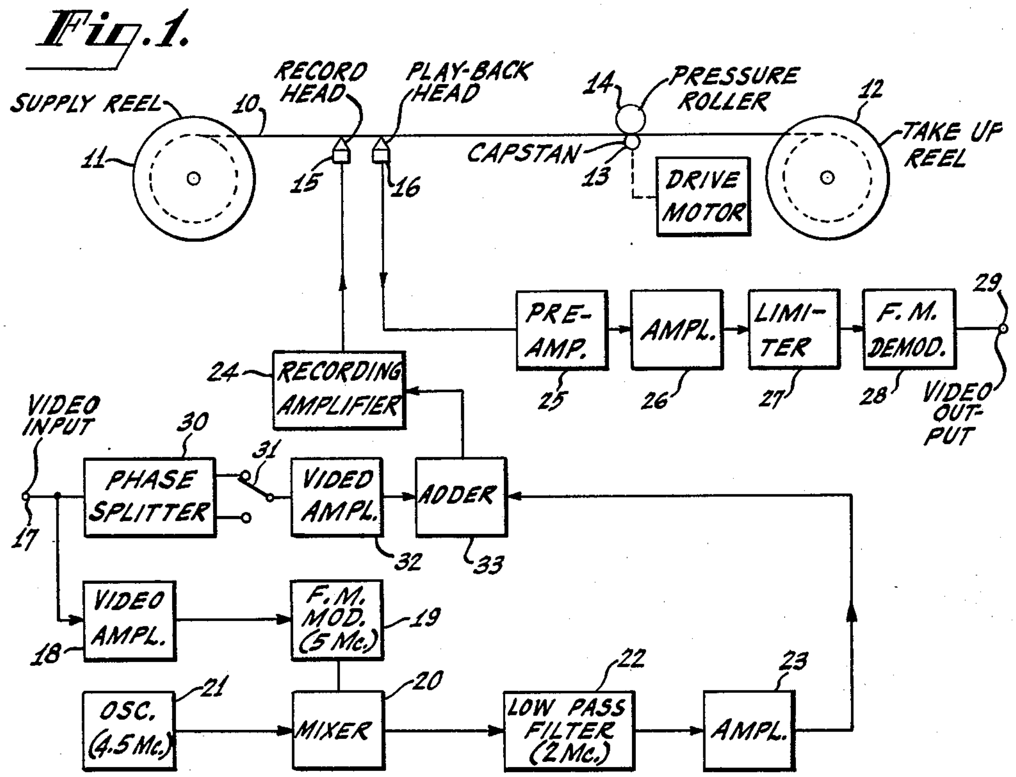

The present invention relates to magnetic recording, and more particularly to a method of and to systems for magnetically recording carrier waves modulated in accordance with information signals.

In recording of high frequency signals, particularly television signals, one method which has been employed is to record a carrier which is modulated in accordance with the high frequency signals. Many modern magnetic recording systems use frequency modulation circuits to provide a frequency modulated carrier.

It has not been possible to utilize the full benefit of carrier recording techniques because of the frequency sensitivity characteristics of the recording and reproduction system, including the magnetic record, which appears to require different recording bias values at different frequencies. Thus, the signal to noise ratio, which measures the performance of the recording system, is lower than that ordinarily obtainable with conventional carrier modulation systems. Prior art systems sought to optimize the signal to noise capabilities of carrier recording systems either by choosing a compromise value of bias or by splitting the signal into different frequency bands so that each band could be recorded separately with a bias of different value. Efforts to continuously vary the bias over the frequency band have not proven successful in the recording of high frequency modulated carriers because of the frequency range involved.

Another difficulty encountered in the recording of carrier signals, particularly frequency modulated carrier signals, may be ascribed to undesired demodulation of the signal at the magnetic head. The magnetic head, like many electronic components, exhibits the effects of inductance and distributed capacitance. In addition, the head is a non-linear device. Thus, the magnetic head presents a tuned circuit having non-linear characteristics, which can be considered like a demodulator. Thus, unwanted demodulation is obtained, which is particularly serious at the higher frequency deviations of the FM carrier. Thus, the detected frequency modulated carrier signal recovered from the magnetic record is distorted and reduced in signal amplitude.

It is accordingly an object of the present invention to provide an improved magnetic recording method and system for handling signal modulated carrier currents.

It is a further object of the present invention to provide a magnetic recording system for frequency modulated carrier signals having improved operating characteristics.

It is a still further object of the present invention to provide improved magnetic recording apparatus incorporating an improved system for providing a signal modulated carrier adapted to be recorded on the magnetic record.

It is a still further object of the present invention to provide a magnetic recording and reproducing system having decreased signal distortion and affording better fidelity of reproduction than magnetic recording systems previously available.

It is a still further object of the present invention to provide magnetic recording apparatus having improved means for counteracting the frequency sensitivity characteristic of the magnetic record medium on which the recording is made.

It is a still further object of the present invention to provide an improved carrier frequency recording system having a better signal to noise characteristic than carrier recording systems peviously available.

It is a still further object of the present invention to provide an improved FM carrier recording system wherein distortion due to undesirable demodulation is obviated.

It is a still further object of the invention to provide an improved method for magnetically recording FM carrier signals.

Briefly described, my invention provides a method and means for combining a modulated carrier and the signal modulating said carrier to provide a composite signal which is adapted to be magnetically recorded. A feature and advantage of the invention is that this composite signal will be reproduced with greater fidelity, higher signal to noise ratio and less distortion than afforded upon reproduction of conventionally recorded modulated carriers.

Figure 2:
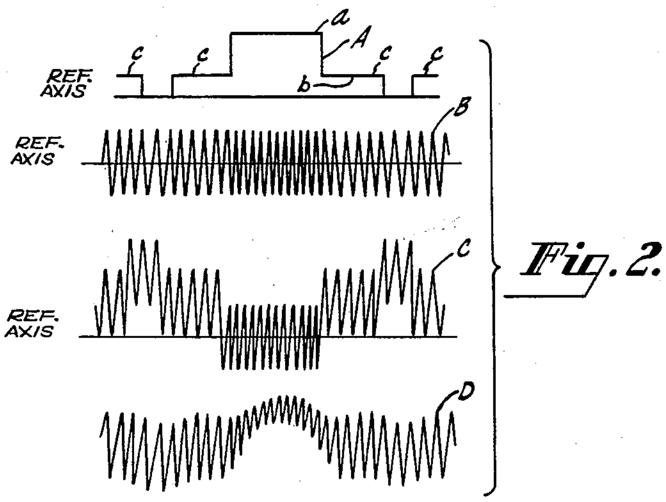

The invention itself, both as to its organization and method of operation, as well as the foregoing and other objects and advantages thereof, will become more readily apparent from a reading of the following description in connection with the accompanying drawings in which:

FIGURE 1 is a diagrammatic presentation, partially in block form, of a magnetic recording and reproducing apparatus having features of the present invention; and FIGURE 2 is a series of waveforms showing illustrative signals possible with the recording and reproducing apparatus shown in FIGURE 1.

Referring, now, more particularly to the drawing, there is shown, in FIGURE 1, a magnetic record in the form of a magnetic tape 10 which is reeled from a supply reel 11 to a take-up reel 12. The tape may be driven at a constant speed by a capstan 13 and pressure roller 14 arrangement. The capstan is driven by a drive motor. A magnetic record head 15 and a magnetic playback head 16 are provided to scan the tape to respectively record signals on and reproduce signals from the tape record. The tape transport system is merely shown diagrammatically since it does not form a part of the present invention.

High frequency signals to be recorded are applied to a video input terminal 17. In the interests of clarity, all ground symbols have been omitted from the drawings. Thus, it may be assumed that a ground symbol is associated with each of the blocks employed in the drawing where necessary. The ground terminal of the television camera chain or other equipment providing the video signal may be connected to the system grounds (not shown). This video signal may vary in frequency from zero (D.C.) to approximately 3.5 megacycles (mc.). Alternatively, the video signal may be filtered to provide low and high frequency components thereof. The high frequency components may then be recorded directly on the tape. The low frequency components may be applied to the video input terminal 17. The video signal is amplified in a video amplifier 18. After amplification, the signal is applied as a modulating signal to an FM modulator 19. This modulator may be of a conventional design and adapted to provide a carrier frequency higher than the highest frequency of the signals to be recorded, for example, approximately 5 mc. In a typical recording system for video signals, it may be found suitable to adjust the amplitude of the video modulating signal so that the frequency deviation of the FM carrier is, for example, approximately 150 kilocycles (kc.) above and below the carrier. It will be observed that the FM modulation occurs around a carrier frequency which is higher than the frequency of the highest video signal. Thus, frequency modulation may be accomplished without intermodulation distortion, and with conventional equipment which is properly operative in the higher frequency region which may be at approximately 5 mc.

The modulated carrier is applied to a mixer 20 together with oscillations of constant frequency which are, for example, 4.55 mc. The oscillations may be derived from an oscillator 21. The mixer 20 may be of conventional design, and, for example, may contain non-linear rectifiers or other non-linear elements. The modulated carrier and the oscillations are heterodyned in the mixer 20. Accordingly, the modulated carrier is shifted in frequency. Taking the frequency deviation to be 300 kc., for example, the lower side bands produced by the mixer 20 extend from 300 kc. to 600 kc. and the upper side bands extend from 9.4 mc. to 9.7 mc. about the oscillations of 4.5 mc.

A low pass filter 22 of conventional design having a cut-off frequency of 2 mc. permits the transmission of only the lower side band which, in the illustrated example, extends from 300 kc. to 600 kc. This lower side band is amplified in an amplifier 23. The magnetic tape generally has a recording characteristic which is more sensitive to lower frequency signals than to higher frequency signals. When the tape is reeled at approximately ten feet per second, the frequency band from 300 kc. to 600 kc. can be recorded without difficulty in accordance with conventional simplex recording techniques using a conventional recording head.

Referring, now, to FIGURE 2, there is shown a sample video signal in waveform A which might be applied to the video input 17. In the waveform A, *a* is assumed to be peak white, C is the black level and the pulse at the least positive portion is the 15,750 c.p.s. sync pulse. The video signal is assumed to be clamped to the reference axis shown. Any frequency modulation in the modulator 19 and after mixing in the mixer 20, which would be operative to shift the frequency band of the frequency modulated carrier to a lower frequency within the recording range of the magnetic tape, the lower side band of the frequency modulated carrier signal may be as shown in waveform B. This waveform would appear at the output of the amplifier 23. If such a frequency modulated waveform as shown in wave form B were recorded directly after amplification in a recording amplifier 24, it would be distorted upon playback.

The playback system shown in FIGURE 1 is essentially conventional. It includes the playback head 16, a preamplifier 25, an amplifier 26 wherein the reproduced signals are amplified. These amplifiers 25 and 26 may include equalization networks to compensate for the transfer characteristics of the magnetic recording and reproducing system. The FM carrier signal obtained from the output of the amplifier 26 is applied to a conventional limiter circuit 27 wherein it is limited in amplitude prior to demodulation in a demodulator 28. The output of the demodulator should be essentially like the signal which is applied to the video input. In other words, if a waveform A were applied to the video input 17, this waveform should be obtained from the video output terminal 29.

It has been found, however, due to the recording characteristics of the system, including the magnetic tape, that the higher frequency components of the frequency modulated signal are distorted, as by being compressed in amplitude. A typical distorted waveform which would be obtained if the waveform B were recorded directly on the tape is shown in waveform D in FIGURE 2. No D.C. (direct current) or reference axis is shown in waveform D, since no D.C. information is passed by the recording-reproducing system. However, for a given waveform D, an average axis may be found by averaging the integrated area of the total waveform. This distortion is theoretically ascribed to the frequency sensitivity characteristics of the magnetic recording and reproducing system, including the tape. Although the higher frequency components of the signal are recorded on the tape with the same degree of magnetization as the lower frequency components of the signal, the system has been found incapable of using these higher frequency components. The waveform D also shows that the distortion in the intermediate frequency region of the FM carrier signal is of an intermediate nature, whereas very little distortion is obtained in the lower frequency part of the signal.

It may be pointed out that the more positive portion *a* of the sample signals shown in waveform A may produce a nominal frequency deviation of 150 kc. above the carrier in the example previously set forth. Thus, this portion of the modulated signal applied to the tape would nominally be at 600 kc. The least positive portion *b* of the signal would produce a nominal frequency deviation of the carrier in the opposite direction of approximately 150 kc.; and therefore the signals recorded on the tape due to the portion *b* of the video signal would be at 300 kc. The intermediate portion *c* of the video signal would produce frequency components of approximately 400 kc. in the FM carrier. It will be appreciated that the modulation system may operate in an alternative fashion to cause frequency deviations above the carrier frequency when the modulating video signal becomes negative-going and below the carrier when the modulating video signal becomes positive-going. In any case, it will be observed that the amount of distortion is dependent upon the frequency of the FM carrier signal and is related to the amplitude of the video signal which is recorded on the tape as a frequency modulated carrier wave.

The distortion in the signal may also be ascribed to demodulation in the magnetic heads. It will be observed, by viewing the envelope of the waveform D, that this envelope is approximately the shape of the waveform A which is applied to the video input.

According to the invention, a bias voltage corresponding to the video input signal is recorded on the tape together with the frequency modulated carrier signal, in order to obviate the distortion inherent in the tape recording system. As will be observed from FIGURE 1, the video input signal is also applied to a channel including a phase splitter circuit 30. A signal of either the same phase as the input signal or in phase opposition to the input signal may be obtained at a switch 31 connected to the output of the phase splitter. This switch is connected to a video amplifier 32. The output signals from the video amplifier 32, which correspond to the video input signals 17, are additively combined in an adder circuit 33 with the FM carrier signal from the amplifier 23 to provide a composite signal. It is this composite signal, waveform C in FIG. 2, that is applied to the recording amplifier 24 and recorded on the tape 10.

The video signal can be reversed in phase in the phase splitter 30. When the switch 31 is in one position, as shown, a phase reversed signal is applied to the video amplifier 32. When the switch 31 makes a connection to the other contact, the phase splitter output signal is a video signal of like phase to the video input signal applied at the terminal 17. Selection of either phase of the video signal is provided to lend flexibility to the system and to select the proper phase relationship between the modulated carrier applied to the adder 33 and the video signal which is also applied to the adder 33. Such flexibility is to be desired, since the number of amplifier stages in the system may be varied, and this will change the phase relationships of the signals applied to the adder 33. A convenient means for selecting the properly phased output signal from the phase splitter 33 is to record a test track on the tape with the switch 31 in one position and then to record another length of test track with the switch 31 in the other position. The track is then played back. The proper switch position will clearly be indicated by noting that portion of the test track which is reproducing with greatest fidelity.

The signal actually recorded on the tape is obtained from the recording amplifier which is driven by the adder 33. The adder 33 may be simply a resistive circuit including a resistor having both the output of the video amplifier 32 and the amplifier 23 applied thereto. The voltage across the resistor is then applied to the input of the recording amplifier 24. Waveform C indicates the output signal which is obtained from the adder 33, and is assumed to fluctuate about the reference axis shown. It will be observed that waveform C is the additive combination of waveform B and waveform A. In the illustrated example, wherein the frequency deviation is to frequencies above the carrier for positive-going modulating signals and to frequencies below the carrier for negative-going modulating signals, the video signal reduces the level of the modulated carrier. In other words, the video signal is subtracted from the modulated carrier. Waveform A is subtracted from waveform B. The level of the modulated carrier is proportionately decreased by the level of the video signal.

In other words, it will be seen that the video signal is applied to the recording head 15 as a bias voltage which is essentially out of phase with the modulating signal that produces the frequency modulated carrier. As the FM carrier frequency goes higher in frequency, the bias current due to the video signal is decreased. The signal recorded on the tape is therefore compensated for the effect of frequency sensitivity of the tape as well as the adverse effects of demodulation which may be produced in the heads 15 and 16. In the event that an FM modulator is used which operates to provide a modulated carrier of increasing frequency with a modulating signal of decreasing amplitude, the video signal applied to the adder 33 will be in phase with the modulating signal applied to the modulator. The result of the composite signal, however, is similar since the bias current due to the video signal decreases as the FM carrier frequency increases. In other words, the amplitude of the bias signal is inversely proportional to the frequency of the modulated carrier.

From the foregoing description, it will be apparent that I have provided an improved magnetic recording and reproducing system and method by means of which greater fidelity of recording and reproduction can be obtained with modulated carriers. While I have shown a system according to my invention in diagrammatic form, various components useful therein, as well as variations in the system itself coming within the spirit of this invention will, no doubt, readily suggest themselves to those skilled in the art. Hence, I desire that the foregoing shall be considered merely as illustrative and not in a limiting sense.

What is claimed is:

1. The combination, in a system for magnetic recording, of input means adapted to receive a modulating signal, means coupled to said input means for producing a signal modulated by said modulating signal, means coupled to said input means and to said signal producing means for modifying said modulated signal by causing the level of said modulated signal to vary according to the level of said modulating signal, and means coupled to said modifying means for magnetically recording said modified modulated signal.

2. The combination, in a modulated signal recording system of input means adapted to receive a modulating signal, means coupled to said input means for producing a signal modulated by said modulating signal, means coupled to said input means and to said signal producing means for additively combining said modulated signal and said modulating signal so that the level of said modulated signal varies according to the level of said modulating signal, a recording device, and means for applying said modulated signal from the output of said combining means to said recording device.

3. Magnetic recording apparatus for recording signals on a magnetic record comprising, in combination, input means adapted to receive a modulating signal, means coupled to said input means for producing a signal frequency modulated by said modulating signal, means coupled to said input means and to said signal producing means for additively combining said modulating signal and said frequency modulated signal to produce a second frequency modulated signal having an amplitude which is inversely related to the frequency of said first frequency modulated signal, and means for magnetically recording said second frequency modulated signal.

4. Magnetic recording apparatus comprising, in combination, input means adapted to receive a first signal to be recorded, means including a frequency modulator coupled to said input means for producing a second signal frequency modulated by said first signal, means coupled to said input means and responsive to said first signal for producing a third signal similar to said first signal but having an amplitude inversely proportional to the frequency of said second signal, means responsive to said second signal and to said third signal for producing a fourth signal identical in frequency to said second signal but having an amplitude inversely related to the frequency of said second signal, a magnetic recording head, and means to apply said fourth signal to said head.

5. Apparatus for recording signals on a record comprising, in combination, input means adapted to receive a first signal to be recorded, means including a frequency modulator coupled to said input means for producing a second signal frequency modulated by said first signal, the frequency of said second signal being directly related to the amplitude of said first signal, phasing means coupled to said input means for producing a third signal in phase opposition to said first signal, means coupled to said second signal producing means and to said phasing means for additively combining said second signal and said third signal to produce a fourth signal identical in frequency to said second signal but having an amplitude inversely related to the frequency of said second signal, and means coupled to said combining means for recording said fourth signal.

6. Apparatus for recording signals on a record comprising, in combination, input means adapted to receive a first signal to be recorded, means including a frequency modulator coupled to said input means for producing a second signal frequency modulated by said first signal, the frequency of said second signal being inversely related to the amplitude of said first signal, means coupled to said input means and to said signal producing means for additively combining said first and second signals to produce a third signal identical in frequency to said second signal but having an amplitude inversely related to the frequency of said second signal, and means coupled to said combining means for recording said third signal.

7. Apparatus for recording a television signal on a magnetic tape comprising, in combination, input means adapted to receive a television signal to be recorded, means including a frequency modulator for producing a second signal frequency modulated by said television signal, means coupled to said input means for producing a third signal corresponding to said television signal but having an amplitude inversely related to the frequency of said second signal, means coupled to said second and said third signal producing means for additively combining said second and third signals to produce a fourth signal of the same frequency as said second signal but having an amplitude varying indirectly with the frequency of said second signal, recording means arranged to record a signal on a magnetic tape, and means to apply said fourth signal to said recording means.

8. Apparatus for recording a television signal on a magnetic tape comprising, in combination, input means adapted to receive a television signal to be recorded, said television signal including high frequency alternating current components, a frequency modulator coupled to said input means for producing a second signal frequency modulated by said television signal, said second signal having a carrier frequency higher than the highest of said components in said television signal, means responsive to said second signal for producing a third signal frequency modulated by said television signal and varying in frequency over a range within the frequency range of said components, means coupled to said input means for producing a fourth signal corresponding to said television signal but having an amplitude varying in inverse relation to the frequency of said third signal, means coupled to said third and fourth signal producing means for additively combining said third and fourth signals to produce a fifth signal of the same frequency as said third signal but having an amplitude inversely related to the frequency of said third signal, recording means arranged to record a signal on a magnetic tape, and means to apply said fifth signal to said recording means.

9. A modulation system comprising, in combination, a source of a first signal including high frequency components, means coupled to said source for producing a second signal frequency modulated by said first signal, the carrier frequency of said second signal being higher than the highest frequency of said components, means responsive to said second signal for producing a third signal frequency modulated by said first signal and varying in frequency over a range within the frequency range of said components, means coupled to said source for producing a fourth signal corresponding to said first signal but varying in amplitude in inverse relation to hte frequency of said third signal, and means coupled to said third and said fourth signal producing means for producing a fifth signal of the same frequency as said third signal but varying in amplitude in inverse relation to the frequency of said third signal.

10. Apparatus for recording a signal on a recording medium comprising, in combination, input means adapted to receive a first signal to be recorded, said signal including high frequency components, means coupled to said input means for producing a second signal frequency modulated by said first signal, the carrier frequency of said second signal being higher than the highest frequency of said components, a source of oscillations of a frequency different from said carrier frequency, means for mixing said second signal and said oscillations to produce a third signal having a lower sideband including a range of frequencies within the frequency range of said components, means responsive to said third signal to produce a fourth signal corresponding to said lower sideband, means coupled to said input means for producing a fifth signal corresponding to said first signal but varying in amplitude in inverse relation to the frequency of said fourth signal, means coupled to said fourth and fifth signal producing means for additively combining said fourth and fifth signals to produce a sixth signal of the same frequency as said fourth signal but having an amplitude in inverse relation to the frequency of said fourth signal, means for recording a signal on a recording medium, and means to apply said sixth signal to said recording means.

11. Apparatus for recording a television signal on a magnetic tape comprising, in combination, a source of a television signal to be recorded, said television signal including high frequency components, means coupled to said source for producing a second signal frequency modulated by said television signal, the carrier frequency of said second signal being higher than the highest frequency of said components, an oscillator arranged to supply a third signal of a frequency different from said carrier frequency, means for mixing said second and third signals to produce a fourth signal, the frequency of said third signal being determined so that said fourth signal includes a lower sideband including a range of frequencies within the frequency range of said components, means responsive to said fourth signal for producing a fifth signal corresponding to said lower sideband and frequency modulated by said television signal, means coupled to said input means for producing a sixth signal corresponding to said television signal but having an amplitude varying in inverse relation to the frequency of said fifth signal, means coupled to said fifth and sixth signal producing means for additively combining said fifth and sixth signals to produce a seventh signal of the same frequency as said fifth signal but having an amplitude varying in inverse relation to the frequency of said fifth signal, means for recording a signal on a magnetic tape, and means to apply said seventh signal to said recording means.

References Cited in the file of this patent

UNITED STATES PATENTS

| | | |
|---|---|---|
| 2,419,195 | Begun | Apr. 22, 1947 |
| 2,497,654 | Begun | Feb. 14, 1950 |
| 2,604,546 | Connell | July 22, 1952 |
| 2,697,755 | Friend | Dec. 21, 1954 |
| 2,816,175 | Blaney | Dec. 10, 1957 |
| 2,839,615 | Sarratt | June 17, 1958 |

OTHER REFERENCES

RCA Review, Sept. 1956, vol. VXII(?), No. 3; pp. 375–377.

Television Engineering, Fink; McGraw-Hill, N.Y.; pp. 216–219.